Patented Oct. 23, 1928.

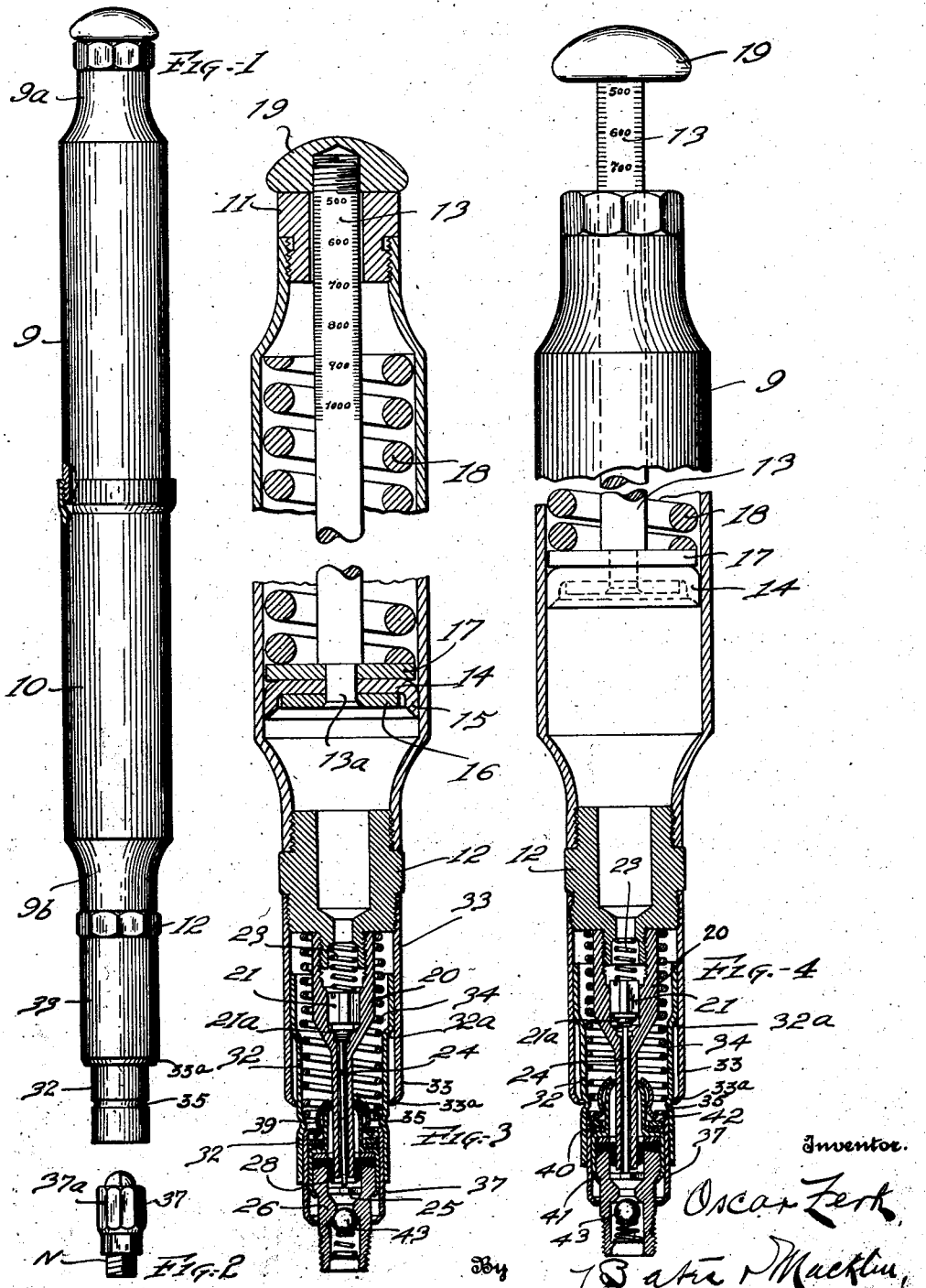

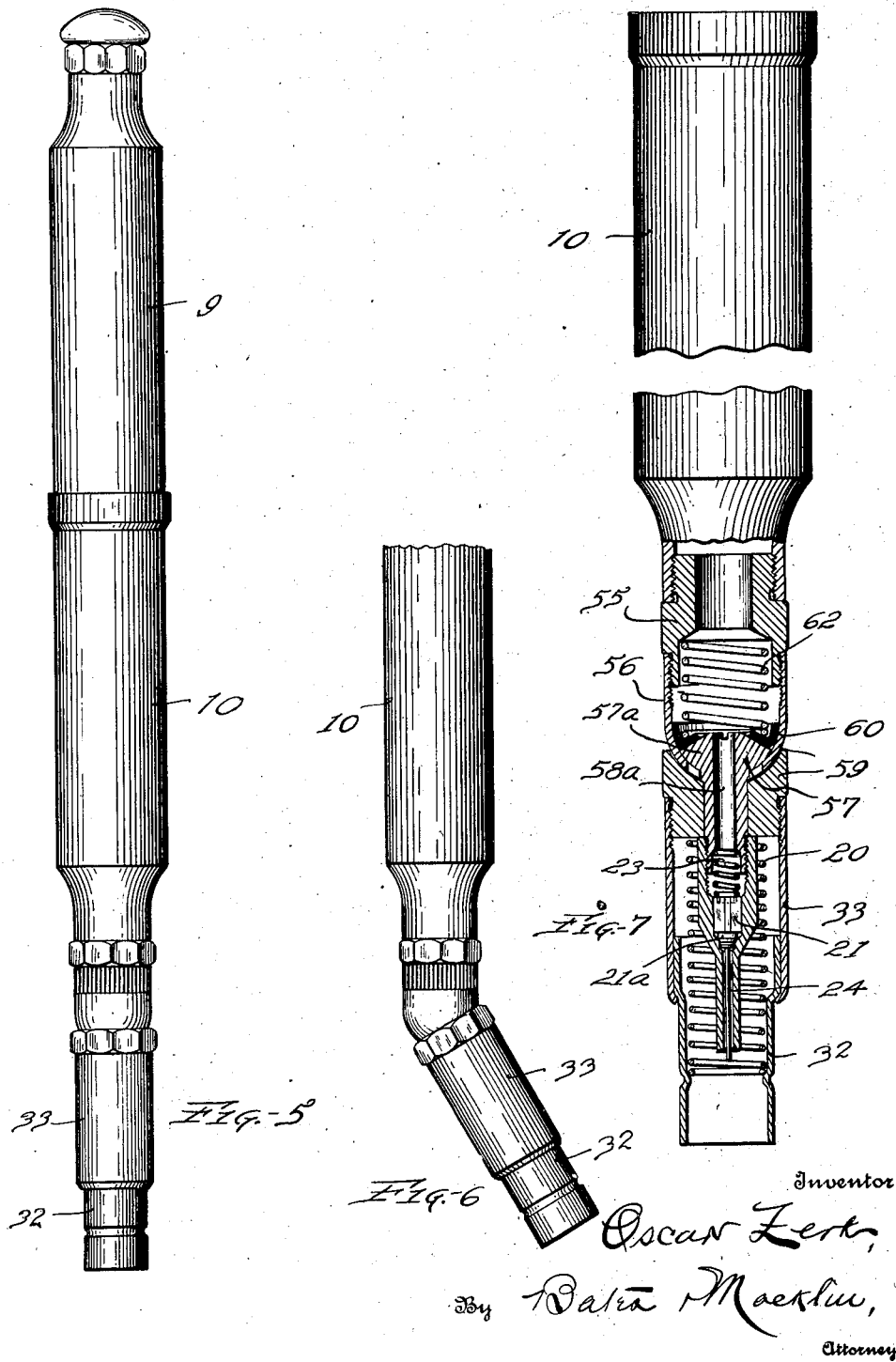

1,688,571

UNITED STATES PATENT OFFICE.

OSCAR ZERK, NOW BY JUDICIAL CHANGE OF NAME OSCAR ULYSSES ZERK, OF CLEVELAND, OHIO, ASSIGNOR, BY MESNE ASSIGNMENTS, TO THE BASSICK MANUFACTURING COMPANY.

LUBRICATING SYSTEM.

Application filed January 20, 1922. Serial No 530,515.

This invention is directed to improvements in lubricating systems, and is more particularly concerned with systems wherein a number of lubricant receiving devices are permanently attached to various elements of the mechanism which is to be lubricated. At the present time there are a variety of lubricating systems wherein a grease gun is provided which is adapted to be interchangeably connected to a plurality of lubricant receiving elements or nipples. In such systems, it is customary to provide the grease gun with coupling means which may be connected to said nipples. The nipples are usually provided with removable covers or dust caps which must be detached from each nipple when the mechanism is being lubricated. These covers frequently become lost with the result that extraneous foreign matter accumulates upon the nipples and is frequently forced into the bearings of the mechanism at the time the lubricating thereof is being effected.

The general object of my invention, therefore, is the provision of an ideal lubricating system comprising a series of lubricating nipples or lubricant receptacles, and a grease gun adapted to be interchangeably coupled to each of the nipples by a simple manual operation consisting of pressing the discharge end of the gun into engagement with the nipples, whereby the uncovering of the nipple orifice, the coupling of the gun to the nipple and the discharging of the lubricant from the gun to the nipple is effected.

An additional object of the present invention is to provide a lubricating system including a number of lubricating nipples having collapsible covers which are adapted to be displaced by a novel coupling arrangement attached to a grease gun; the uncovering of the grease receiving aperture of the nipple and the coupling of the gun being effected in the same operation.

A further object of my invention is the provision of valve means disposed in the coupling end of the gun which will be automatically opened during a manual coupling operation whereby grease or other lubricant, which has been compressed in the gun barrel previous to the coupling operation, may be injected into the nipple.

Another object of the present invention is the provision of a lubricating nipple, gun coupling means, and valve means which may be respectively operated upon a single manual coupling operation; the valve means and coupling means being of such construction as to permit angular adjustment thereof, relative to the gun barrel.

Other objects will become apparent from the following description herein set forth in reference to the accompanying drawings; the essential characteristics are summarized in the claims.

In the drawings, Fig. 1 illustrates a gun which is shown as being disposed above and in alignment with a lubricating nipple shown in Fig. 2; Fig. 3 is a cross sectional view of the gun and the nipple showing the relation of the various parts when the connecting operation is partially completed; Fig. 4 is a similar view illustrating the relation of the gun and nipple when the coupling operation has been completed; Fig. 5 is an alternate construction wherein the coupling means is adjustably connected to the gun barrel; Fig. 6 is a detailed elevation of the discharge end swung at an angle; and Fig. 7 is a cross sectional view illustrating the construction forming the connection between the gun barrel and the coupling means.

Designating the various elements of my device by reference characters, in Fig. 1 I have illustrated a lubricating gun of the prepressure type having a barrel formed of joined tubular members 9 and 10; each member comprising substantially one-half of the gun barrel. The upper and lower ends of the respective barrel members are contracted into interiorly threaded neck portions 9ª and 9ᵇ to respectively receive a reducing member 11 and a closure member 12. The member 11 serves as a guide or bearing for a graduated stem 13. The stem has a spring actuated piston 14 secured to the inner end thereof.

The piston may be a flexible cup member 15 which is disposed between metallic washer members 16 and 17; the three members comprising the piston being rigidly mounted on a reduced portion 13ª of the piston stem. This piston construction may be designed to have sufficient strength to withstand the thrust of the heavy spring member 18 which is disposed within the barrel between the piston and the upper end thereof. A suitable stop member 19 may be secured to the outer end of the stem to prevent the piston from being wedged in the converging portion 9$^b$ of the lower end of the gun barrel by the pressure of the spring.

The reducing member 12 is provided with a nozzle member 20 which is arranged to extend into a lubricating nipple N during the operation of coupling the gun thereto. The nozzle member 20 may have a valve seat formed therein adapted to be closed by a valve plug 21 which is loosely mounted in a suitable bore formed in the nozzle member. This plug member may have a substantially square portion with the corners slightly rounded to afford bearing contact with the inner wall of the nozzle member. The lower end of the plug member may be formed into a valve closing portion 21$^a$ which is adapted to normally maintain the lubricant within the gun barrel against the pressure of the spring member 18.

A resilient member 23 is placed between a shoulder formed in the reducing member 12 and the upper end of the plug member 21 to maintain the valve plug on the valve seat.

A valve stem 24 is disposed within the discharge end of the nozzle member 20 and the lower end of the valve plug 21 and is adapted to act on the valve plug. The member 24 may project a sufficient distance from the discharge orifice of the nozzle member to cause a raising of the plug member 21 when the stem is brought into abutting relation with a rigid plate 25 in the nipple body 26.

A resilient washer member 28 is provided within the nipple to engage the outer surfaces of the discharge neck of the nozzle member when the latter is inserted in the nipple during the coupling operation.

The nipple construction embodies a novel dust cover or cap construction which is arranged to recede from the nipple receiving aperture during the first part of the gun coupling operation.

To effect the uncovering of the nipple, I have provided a movable sleeve member 32 slidable in the tubular member 33 mounted on the reducing member 12, which sleeve member may act on the nipple cover. The sleeve 32 is maintained in extended position by a spring member 34 which is arranged to have one end abut the reducing member 12, while the other end rests on an inwardly extending bead 35 formed in the member 32. The sleeve member 32 may have the upper end thereof enlarged whereby a shoulder 32$^a$ is provided to coact with the turned in end 33$^a$ of the tubular member 33. The spring member 34 may thus be maintained in a normally compressed condition.

The outer end of the slidable member 32 may be of such dimensions that the inner surfaces thereof will engage the ridges 37$^a$ of the nipple cover member 37. Hence the tubular member may be slipped on to this cover member until the beaded portion 35 thereof engages the upper edge of the cover member 37. Further movement of the tubular member toward the nipple will press or move the cover member, downwardly, causing the inturned upper end of the cover member to engage and depress the outwardly flaring lower edges of the cap members 39, resulting in a pivotal movement of these cap members about the dome-shaped inlet end of the nipple. This pivotal movement of the cap members 39 results in a separating of the upper ends of these members and consequent uncovering of the inlet of the nipple.

The cover member 37 and cap members 39 are maintained in a normally closed condition by a conic spring member 40 which is disposed between the upper shoulder formed on a body member 41 of the nipple, and a disc member 42, upon which the lower portions of the cap members rest.

It is important that the spring member 34 be of sufficiently greater strength than the spring member 40 to effect a complete compression of the latter spring member before the first named spring member yields. It will be evident that the tubular member 32 extends a sufficient distance beyond the lower end of the discharge nozzle to permit sufficient movement of the gun to uncover the receiving aperture of the nipple before the discharge nozzle has reached the same.

In Fig. 3 the tubular member 32 is illustrated as having been coupled to the nipple cover and the latter is shown in a downward or open position. In the same figure the spring member 34 is illustrated as having been considerably compressed and the tubular member 32 telescoped a considerable distance into the outer tubular member 33.

In Fig. 4 the relation of the gun coupling means and nipple is illustrated at the completion of the coupling operation. In this view, the valve plug 21 is shown as having been raised out of contact with the valve seat by the stem 24 and the discharge end of the nozzle is illustrated as being in abutting relation with the plate 25. In this position, the grease or lubricant is being discharged under high pressure from the gun barrel by spring 18. To provide an unobstructed passageway at the discharge end of the nozzle, a transverse slot is formed therein which permits the lubricant to escape from the gun nozzle. The lubricant is then forced around the plate 25 which is substantially square in cross section. A ball valve member 43 is then depressed by the lubricant as it flows into the bearing which is being lubricated.

It is evident that the packing member 28 should be disposed a sufficient distance above the plate 25 to permit a partial withdrawal of the nozzle member from the nipple during which period the plug valve 21 is being reseated. The gun barrel may be filled with lubricant under high pressure during which operation the spring member 18 will be compressed by the piston.

It frequently occurs that lubricating nipples are disposed about various parts of a mechanism in such positions that grease guns having rigid coupling means could not be coupled directly thereto. I therefore have provided a joint between the coupling means and the gun barrel which will permit angular adjustment of the coupling means relative to the gun barrel, as illustrated in Figs. 6 and 7. In this construction, the valve means and nozzle discharge member may be substantially as illustrated in Figs. 3 and 4. The reducing member 12, however, may be replaced by a connecting member 55 and a tubular member 56; the latter member having the lower end thereof terminating in a knobbed or spherical formation. The inner surface of the spherical portion of the tubular member 56 is engaged by a member 57 having a complementary surface in engagement therewith. This member may have a passageway 58ª communicating with the discharge nozzle.

In this construction the outer tubular member 33 may be secured to a sleeve 59 having the upper end thereof formed to provide a surface complementary to the spherical end of the tubular member 56.

Packing means may be disposed within the tubular member 56 which may be comprised of a cup washer 60 formed of pressed cork or other suitable resilient packing material arranged to engage the inner wall of the tubular member 56 and the conical end 57ª of the member 57. The packing washer is maintained in compressed relation to members 58 and 60 by a spring member 62.

This packing arrangement is such that the spring member 62 acts to maintain a sealed joint, not only when low pressures are present in the gun barrel but when the pressure is increased. The lubricant acts directly upon the packing washer 60 and compresses it against the walls of the tubular member 56 and the end of the member 57. This construction permits the coupling means to be angularly adjusted within certain limits, relative to the gun barrel, and the packing means is such that leakage at the joint is prevented, irrespective of the amount of said adjustment.

Many advantages are obtained by the use of a lubricating system such as I have herein described. The feature of having lubricating nipples which may be shielded by a suitable cover but which may be uncovered without necessitating the annoyance of manually removing the cover is of paramount importance in that the uncovering of the nipple, the coupling of the gun thereto, and the discharging of the lubricant from the gun barrel into the nipple may be accomplished by the simple manual operation of pressing the end of the gun against the nipple. A further advantage to be found in my lubricating system is that the nipple covers may be conveniently secured to the nipples that they cannot become displaced or lost.

Having thus described my invention, I claim:—

1. In combination with a nipple for feeding lubricant to an element to be lubricated, a grease gun comprising a barrel, means for constantly exerting pressure within the barrel, a discharge nozzle connected with the barrel, a valve interposed between the discharge end of the nozzle and the barrel, means projecting from the nozzle for opening said valve, and telescopic coupling means extending from said barrel for connecting the grease gun to said nipple by exerting longitudinal manual pressure on the gun whereupon said valve opening means will be operated.

2. In combination with an apertured nipple for feeding lubricant to an element to be lubricated, a grease gun having a gun barrel adapted to be held manually in contact with said nipple, means for automatically exerting pressure on the grease in said barrel, a discharge nozzle extending from the gun barrel, a valve interposed between the gun barrel and the discharge end of said nozzle adapted to normally seal the gun barrel from the outlet nozzle, an external dust shield on the nipple for covering the aperture therein, and a hollow guide carried by the gun adapted to enclose and act upon the shield to effect the exposing of the aperture in the nipple when said gun is pressed longitudinally thereagainst.

3. In a lubricating system, the combination of a lubricating nipple adapted to be secured to an element to be lubricated, said lubricating nipple having a dust cover shielding the receiving orifice thereof from extraneous matter, a grease gun having means for constantly and automatically exerting pressure upon the grease in the gun barrel, and a hollow guide telescopically secured to the delivery end of the gun for enclosing and uncovering said nipple orifice when the gun is connected to the nipple.

4. In a lubricating system, a lubricating nipple adapted to be secured to an element to be lubricated, a cover for shielding the orifice of the nipple from extraneous matter, a lubricant dispensing gun having means for coupling the gun barrel to the nipple, including guide means for enclosing and automatically unshielding the orifice of the nipple when the gun is coupled thereto by manual pressure lengthwise of said gun, a discharge nozzle connected to the gun barrel, a valve interposed between the discharge orifice of the nozzle and the gun barrel, and valve opening means adapted to open said valve consequent upon a coupling of the gun to the nipple.

5. In a lubricating system, the combination of a lubricating nipple adapted to be secured to an element to be lubricated, a cover for shielding the orifice of the nipple from extraneous matter, a lubricant dispensing gun having means for constantly and automatically exerting pressure on the grease disposed in the gun barrel, a nozzle having communication with the gun barrel and adapted to be inserted in the orifice of said nipple, a valve interposed between the gun barrel and the discharge orifice of the nozzle, means adapted to enclose and couple the gun to the nipple by longitudinal pressure upon the gun, said means including telescopic members adapted to act upon the nipple cover to unshield the nipple orifice whereby said nozzle may enter said orifice during a single manual coupling operation of attaching the gun to said lubricating nipple, and means rigid with the nipple for operating said valve opening means whereby the valve will be open at the completion of the coupling operation.

6. In a lubricating system, the combination of a lubricating nipple adapted to be secured to an element to be lubricated, said lubricating nipple having a dust cover shielding the receiving orifice from extraneous matter, a lubricant dispensing gun having means for constantly and automatically exerting pressure upon the lubricant in the gun barrel, and means carried by the gun for enclosing and uncovering the orificed end of said nipple when the gun is connected to the nipple, said means being angularly adjustable relative to the gun barrel.

7. Lubricant injection means comprising a lubricant barrel, a discharge conduit at the end thereof, a fitting having means for forming a tight seal with the end of said conduit, flow control means opened by the force used to move said conduit and sealing means into assembled relation after the seal is formed only, and lubricant compressing means normally under initial tension and positioned to receive and transmit the force used to move the parts together and thereby additionally compress the lubricant in the barrel.

8. Lubricant injection means comprising a lubricant barrel, a discharge conduit at the end thereof, a fitting having means for forming a tight seal with the end of said conduit, flow control means opened by the force used to move said conduit and sealing means into assembled relation after the seal is formed only, and lubricant compressing means comprising a piston in said barrel, and a piston rod projecting out of the barrel to receive the force used to move the parts together, whereby said force also places the lubricant under compression.

9. Lubricant injection means comprising a lubricant barrel, a discharge conduit at the end thereof, a fitting having means for forming a tight seal with the end of said conduit, flow control means opened by the force used to move said conduit and sealing means into assembled relation after the seal is formed only, and lubricant compressing means positioned to receive and transmit the force used to move the parts together and thereby compress the lubricant in the barrel.

In testimony whereof, I hereunto affix my signature.

OSCAR ZERK.